UNITED STATES PATENT OFFICE.

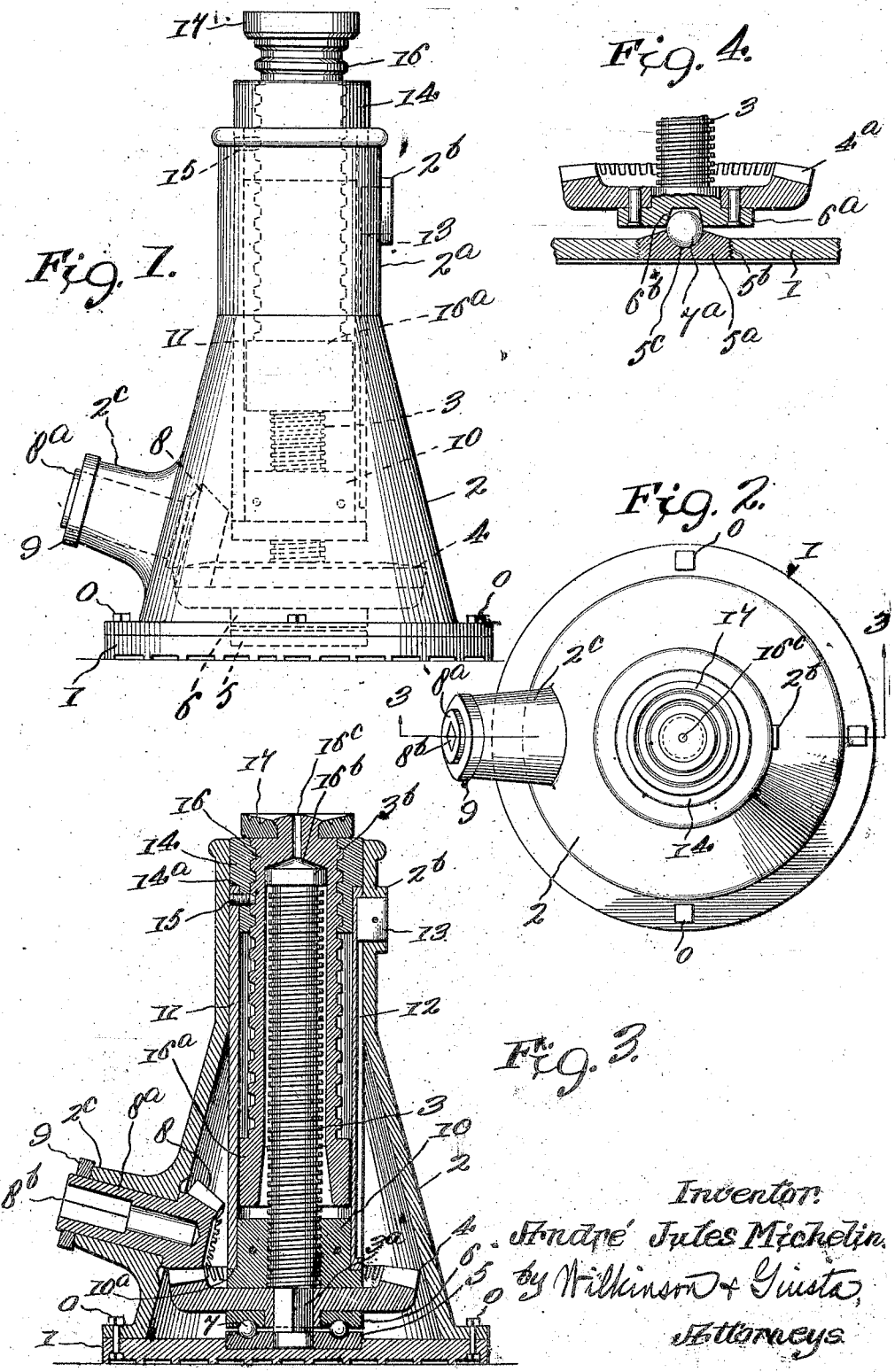

ANDRÉ JULES MICHELIN, OF PARIS, FRANCE, ASSIGNOR TO MICHELIN & CIE., OF CLERMONT-FERRAND, FRANCE, A CORPORATION OF FRANCE.

JACK FOR AUTOMOBILES.

1,275,971.  Specification of Letters Patent.  Patented Aug. 13, 1918.

Application filed December 27, 1917. Serial No. 209,092.

*To all whom it may concern:*

Be it known that I, ANDRÉ JULES MICHELIN, a citizen of the French Republic, residing at Paris, France, have invented certain new and useful Improvements in Jacks for Automobiles; and I do hereby declare the following to be a full, clear, and exact description of the invention, such as will enable others skilled in the art to which it appertains to make and use the same.

My invention relates to improvements in lifting jacks, and especially in lifting jacks adapted to be used with automobiles where it is desired to secure a light, compact and efficient structure that may be conveniently carried as a part of the equipment of the automobile, and also may be used in the garage; and which is not liable to get out of order, or to get clogged up with dust, and may be kept well lubricated.

My invention will be more fully understood after reference to the accompanying drawing, in which:—

Figure 1 is a side elevation of the jack showing the head partly raised from the casing.

Fig. 2 is a plan view of the jack shown in Fig. 1.

Fig. 3 shows a central vertical section along the line 3—3 of Fig. 2, and looking in the direction of the arrows; and Fig. 4 shows a simplified form of thrust bearing for use in the jack.

The parts are contained in a casing which consists of a base plate 1, preferably ribbed or roughened at the bottom so as not to slip on the ground, and a hollow housing 2, which is flanged at the bottom and is secured at the plate 1 by suitable bolts $o$.

This housing 2 is preferably tapered in the form of a truncated cone at its lower end, and its upper end is cylindrical, as shown at $2^a$, and is provided with a cylindrical bore to form a bearing for the tube and the upper nut, as will be hereinafter described.

This housing is provided with a slot $2^b$ for the spline piece 13, and with a cylindrical bearing $2^c$ for the stem of the operating pinion.

Journaled in the axis of the housing 2 is a screw 3 having its bottom portion made angular, as at $3^a$, to engage in the center of the gear wheel 4, which is supported on suitable anti-friction thrust bearings, such, for instance, as the rings 5 and 6 and the interposed balls 7. The gear wheel is rotated by means of the pinion 8 whose stem $8^a$ is journaled in the bearing $2^c$, and is provided with a socket $8^b$ for the operating tool, not shown. The stem is held in place in its bearing by means of the lock ring 9.

10 represents a nut which engages the screw threads on the screw 3, and is moved up or down as said screw is rotated; the rotation of the screw being effected by the pinion 8 and gear wheel 4, already referred to.

Secured to this nut 10 and abutting against the shoulder $10^a$ of said nut is the tube 11, which is splined along an element thereof, as at 12, to engage the spline 13, and thus to cause the said tube to move in a vertical direction but without turning. This tube carries at its upper end the nut 14, having a coarse internal screw thread, and having a shoulder $14^a$ engaging the upper end of the tube 11; the said nut 14 being rigidly secured to the tube 11 in any convenient way, as by means of the set screws 15.

Passing through the upper nut 14 is the lengthening member 16, in the form of a hollow screw, having coarse screw threads to engage with the screw threads of the nut 14, and having an annular shoulder $16^a$ adapted to engage the lower face of said nut 14 when the lengthening member is in the raised position, that is when the jack has been extended to its greatest height. The upper end of this hollow lengthening member 16 is recessed as at $16^b$ to form a stop for the head $3^b$ of the screw 3, when the lengthening member is in the lowered position shown in Fig. 3. Secured to the end of this lengthening member 16 is the jack-head 17.

The lengthening member 16 is preferably perforated, as at $16^c$, to permit the insertion of lubricant into the interior of the tube 11, so that it will keep the inclosed screw 3 well lubricated.

To secure the best results, the nuts 10 and 14 should preferably be made of bronze or other metal having a small coefficient of friction with steel, and the screw 3 and lengthening member 16 should preferably be made of steel, as also the gear wheel 4 and pinion 8.

The housing 2 and plate 1 may be made of cast steel or malleable iron, or any suitable material.

In the form of device shown in Fig. 4, instead of having a ball race, as shown in Fig. 2, a single ball and socket bearing is provided, in which 3 represents the lifting screw whose lower end is fast to the block 6ª secured to the gear wheel 4ª, and this block 6ª is provided with a socket 6ᵇ to engage the ball 7ª. This ball rests in a socket 5ᶜ in the ordinary metal bearing 5ª screwed into the plate 1, as at 5ᵇ.

In either construction, I provide an anti-friction thrust bearing for the gear wheel 4 and screw 3 secured thereto.

The operation of the device is as follows: When out of use the parts will be in the position shown in Fig. 3, now if it is desired to lift one end of the axle of an automobile, or other wheeled vehicle, turn the jack head 17 by hand, causing the coarse screw threads on the extension piece 16 to permit the quick extension of the jack head 17 until the jack head bears on the bottom of the axle to be lifted; now insert the operating tool, such as an ordinary hand crank, or a ratchet and pawl and lever arrangement, in the socket 8ᵇ, and turn the pinion 8 in the proper direction to cause the screw 3 to lift the nut 10 and the parts supported thereby.

It will be seen that quick extension of the jack may be secured and then the slow movement under power is applied.

It will be noted that the head of the jack may be lifted almost the full length of the screw 3, plus the distance between the shoulder 16ª and the lower face of the nut 14, when the parts are in the position shown in Fig. 3. This will be the maximum throw of the jack.

After the jack is extended, in order to restore the parts to the initial position, turn the pinion 8 in the reverse direction so as to bring the nut 10 down to its bearing on the top of the gear wheel 4, and then turn the head of the jack until the lengthening member assumes the position shown in Fig. 3. When in this position the parts of the jack are in extremely compact form and may be very conveniently stored away in the tool box of the automobile.

It will be noted that the screw 3 and nut 10 will be protected from dust and other foreign matter, and may be readily lubricated through the opening 16ᶜ, which opening may be closed if desired with any suitable removable plug. Furthermore, when the lengthening piece is brought to its most extended position its screw threads may be conveniently cleaned and lubricated, while these threads, as also the threads of the nut 14, are normally protected against dust, when the jack is in the closed position, by the head of the jack, as shown in Fig. 3.

It will be obvious that various modifications might be made in the herein described apparatus, and in the construction, combination and arrangement of parts which could be used without departing from the spirit of my invention, and I do not mean to limit the invention to such details except as specifically pointed out in the claims.

Having thus described my invention what I claim and desire to secure by Letters Patent of the United States is:—

1. A lifting jack comprising a substantially dust tight casing, a lifting screw journaled in said casing, gearing operable from the exterior of said casing for turning said screw, a lower nut mounted upon said screw, a tube fast to said lower nut and vertically movable in said casing, an upper nut fast to said tube, a lengthening member in the form of a hollow screw mounted over said lifting screw and engaging said upper nut, and a head carried by said lengthening member, substantially as described.

2. A lifting jack comprising a substantially dust tight casing, a lifting screw journaled in said casing, gearing operable from the exterior of said casing for turning said screw, a lower nut mounted upon said screw, a tube fast to said lower nut and vertically movable in said casing, an upper nut fast to said tube, a lengthening member in the form of a hollow screw mounted over said lifting screw and engaging said upper nut, anti-friction thrust bearings mounted in said casing and supporting said screw, and a head carried by said lengthening member, substantially as described.

3. A lifting jack comprising a substantially dust tight casing, a lifting screw journaled in said casing, gearing operable from the exterior of said casing for turning said screw, comprising a pinion shaft projecting through said casing, a pinion driven thereby, a gear wheel driven by said pinion, and a lower nut mounted over said screw and fast to said gear wheel, a tube fast to said lower nut and vertically movable in said casing, an upper nut fast to said tube, a lengthening member in the form of a hollow screw mounted over said lifting screw and engaging said upper nut, and a head carried by said lengthening member, substantially as described.

4. A lifting jack comprising a substantially dust tight casing, a lifting screw journaled in said casing, gearing operable from the exterior of said casing for turning said screw, comprising a pinion shaft projecting through said casing, a pinion driven thereby, a gear wheel driven by said pinion, and a lower nut mounted over said screw and fast to said gear wheel, a tube fast to said lower nut and vertically movable in said casing, an upper nut fast to said tube, a lengthening member in the form of a hollow screw mounted over said lifting screw, and engaging said upper nut, anti-friction thrust bearings mounted in said casing and supporting said screw, and a head carried by said lengthening member, substantially as described.

5. A lifting jack comprising a substantially dust tight casing, a lifting screw journaled in said casing, gearing operable from the exterior of said casing for turning said screw, a lower nut mounted upon said screw, a tube fast to said lower nut and vertically movable in said casing, an upper nut having coarse internal screw threads relative to the threads on said lifting screw and fast to said tube, a lengthening member in the form of a hollow screw mounted over said lifting screw and engaging said upper nut, and a head carried by said lengthening member, substantially as described.

In testimony whereof, I affix my signature.

ANDRÉ JULES MICHELIN